United States Patent
Guimbretiere

[11] Patent Number: 5,158,507
[45] Date of Patent: Oct. 27, 1992

[54] TRANSMISSION DEVICE WITH DIFFERENTIAL AND COUPLING PARTICULARLY FOR MOTOR VEHICLES

[75] Inventor: Pierre Guimbretiere, Neauphle le Chateau, France

[73] Assignee: Glaenzer Spicer, Poissy, France

[21] Appl. No.: 748,789

[22] Filed: Jul. 31, 1991

[30] Foreign Application Priority Data

Aug. 7, 1990 [FR] France .................. 90 10072

[51] Int. Cl.⁵ .................... F16H 1/44; B60K 17/20
[52] U.S. Cl. .................... 475/231; 475/240; 475/235; 475/249; 475/85; 192/58 C
[58] Field of Search ............ 475/231, 233, 234, 235, 475/236, 240, 242, 243, 249, 84, 85, 87; 192/58 B, 82 T, 58 C

[56] References Cited

U.S. PATENT DOCUMENTS

| | | | |
|---|---|---|---|
| 3,404,585 | 10/1968 | Roper | 192/58 C |
| 3,457,807 | 7/1969 | Altmann | 475/240 X |
| 3,811,341 | 5/1974 | Goscenski, Jr. | 475/231 |
| 4,022,084 | 5/1977 | Pagdin et al. | 475/249 X |
| 4,041,804 | 8/1977 | Clark | 475/249 X |
| 4,096,712 | 6/1978 | Webb | 192/58 B X |
| 4,462,272 | 7/1984 | Roper | 475/240 |
| 4,474,080 | 10/1984 | Day | 475/235 |
| 4,594,913 | 6/1986 | Opitz | 475/235 |
| 4,838,119 | 6/1989 | Teraoka et al. | 192/58 B X |
| 4,914,980 | 4/1990 | Taureg et al. | 475/231 X |
| 5,021,038 | 6/1991 | Beigang | 475/85 |
| 5,055,096 | 10/1991 | Riemscheid et al. | 475/249 |
| 5,059,160 | 10/1991 | Raniero | 475/231 X |

FOREIGN PATENT DOCUMENTS

| | | |
|---|---|---|
| 0193160 | 3/1986 | European Pat. Off. . |
| 0371266 | 6/1990 | European Pat. Off. . |
| 1455879 | 5/1964 | Fed. Rep. of Germany . |
| 3609418 | 2/1986 | Fed. Rep. of Germany . |
| 3630974 | 2/1987 | Fed. Rep. of Germany . |
| 3643732 | 7/1988 | Fed. Rep. of Germany . |
| 2044898 | 2/1971 | France . |
| 925176 | 5/1963 | United Kingdom . |
| 986817 | 3/1965 | United Kingdom . |

Primary Examiner—Leslie A. Braun
Assistant Examiner—Khoi Q. Ta
Attorney, Agent, or Firm—Harness, Dickey & Pierce

[57] ABSTRACT

According to the invention, an output element of a differential is made in two parts (14a, 14b), one (14b) of these two parts being axially mobile under the effect of a torque transmitted through this output element. This axial displacement is used to act either on a friction clutch or preferably on a coupling of the viscocoupler type in order to modify its characteristics.

Application particularly to motor vehicles.

18 Claims, 3 Drawing Sheets

TRANSMISSION DEVICE WITH DIFFERENTIAL AND COUPLING PARTICULARLY FOR MOTOR VEHICLES

The present invention relates to differential transmissions used particularly in motor vehicles.

These differentials comprise one input element and two output elements mounted so that they rotate about the same axis, the two output elements being connected, in one form of layout, to lateral propeller shafts leading to the main wheels of the vehicle. In another configuration, the two output elements may be connected respectively to the input elements of two other differentials.

Improvements have been sought in the operation of these differentials by combining them with locking or slip-limiting devices.

A first type of self-locking differential comprises at least one friction clutch interposed between two of the said input and output elements, this clutch being controlled by at least one mobile element inside the differential, the position of which depends on the torque which passes in transit through this differential.

A second attempt to improve the operation of a differential consisted in associating it with a coupling device with discs and with a viscous fluid operating in shear ("viscocoupler"), interposed between two of the said input and output elements of the differential. In this second case, it is the difference in rotation speed between the two elements between which the viscocoupler device is interposed which determines the braking efficiency of the said viscocoupler device.

These two types of device have disadvantages which result from the fact that in one case the clutch control in practice takes into account only the torques passing in transit through the differential and the sign of the difference in speeds between the output elements, while in the second case it takes into account only the difference in speeds between the elements between which the viscocoupler device is interposed. The result is that, in both cases, there are unchangeable and hence unsuitable characteristics of the variation in torque as a function of the speed difference.

These disadvantages manifest themselves particularly, for the first type of device, through difficulties with steering during parking manoeuvres, or else through the creation of torques, transferred between wheels or between axles, which are large and whose direction can change abruptly, even though the ground only allows weak driving or braking torques, and for the second type through a certain deficiency in the use of antilock brake control systems (ABS).

Patent Application FR-90 05 907 proposes a device which enables most of these disadvantages to be overcome and which has a wider range of use than known devices. This application relates to a device consisting of a differential comprising a housing, one input element and two output elements, and a controlled-slip coupling device disposed between two of the said input and output elements; it is characterised in that the differential includes at least one element which is mobile under the effect of an engine torque, the displacement of which is used to modify the operational characteristics of the controlled-slip coupling device.

In a variant of the embodiment, the mobile element is an additional inner housing sliding axially within the main housing and sets of ramps and pins provided, respectively, on the main and inner housings, making it possible to obtain the axial displacement of the said inner housing during a relative angular displacement between the two housings. When the torque is an engine torque, the ramps act on the pins so as to displace the inner housing in one direction. Stops are also provided so that the two housings rotate solidly with each other during a torque from engine braking, without axial displacement of the inner housing.

Such solutions with an inner housing are satisfactory since they enable the original clearances and gearing adjustments to be preserved. They are, on the other hand, expensive and bulky.

The objective sought here involves obtaining comparable results at lower cost and with less bulk.

To achieve this, the subject of the invention is a transmission device, particularly for motor vehicles, comprising a differential consisting of a housing, one input element and two output elements, and a coupling device disposed between two of the said input and output elements, an output element of the differential with which the coupling device cooperates being made in two parts, one of which carries teeth and cooperates with at least one other component of the differential, while the second is axially mobile over a predetermined distance, and is solidly attached to the rotation of an output shaft, means being provided between these two parts to allow a limited angular clearance between them and so that a relative angular displacement between these two parts under the effect of a torque is reflected in an axial displacement of the said second part which acts on the coupling device, characterised in that the first part of the output element, which carries teeth, bears axially against a component itself fixed axially.

According to other characteristics:

the said first part bears against one face of the differential housing.

the said first part bears against one face of a pinion-holder forming part of the differential.

the said means comprise sets of ramps inclined with respect to the direction of the axis of the said output element, which cooperate with each other when an engine torque passes in transit through the differential.

the said means also comprise sets of ramps which cooperate with each other when a braking torque passes in transit through the differential.

the said output element is a side gear.

the mobile part of the side gear incorporates a sleeve connected by splines to the output shaft.

the coupling device is a friction clutch and the mobile part of the output element acts in such a way as to control this clutch.

the coupling device is a viscocoupler and the mobile part of the output element acts in such a way as to alter the operational characteristics of this viscocoupler.

The invention will be described in more detail below with reference to the appended drawings, given solely as examples, and in which.

Figure 1:
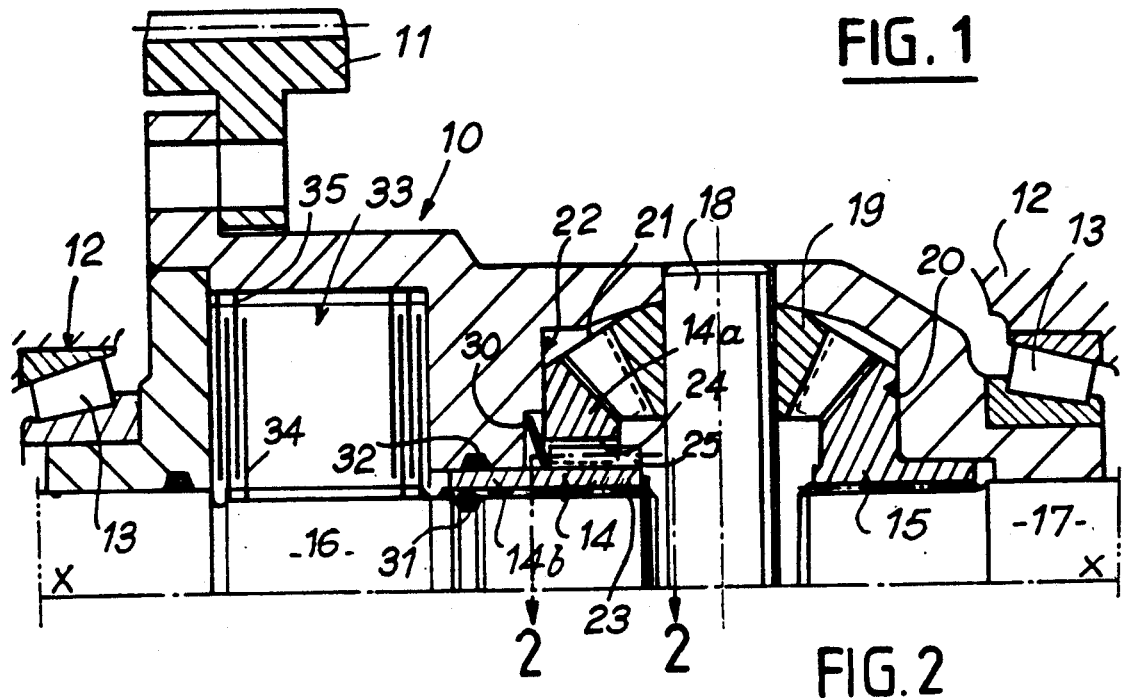
FIG. 1 is a partial longitudinal cross-sectional view of a transmission device according to the invention.

In FIG. 1 can be seen a differential comprising a housing 10 which is solidly attached to a crown wheel 11 and which forms the input element of this differential, this housing being mounted in such a way that it can rotate, with respect to a supporting member 12, by means of bearings 13 whose axes lie along X—X. Mounted within this housing in such a way that they can rotate around the same axis X—X are two side gears 14, 15 which constitute the output elements of the differential and which are connected respectively to shafts 16 and 17. Moreover, the housing carries at least one pinion-holding pin 18 on which are disposed side pinions 19 whose teeth mesh with the side gears 14, 15.

The side gear 15 bears laterally in a standard manner against a face 20 of the differential housing.

According to the invention, the side gear 14 is made in two parts 14a, 14b. The first part 14a incorporates teeth 21 engaging with the teeth of the side pinions 19 and abuts a face 22 of the housing. The second part 14b is solidly attached to the shaft 16 by means of splines 23 and it is mounted in such a way as to be capable of sliding along the direction of the axis X—X. The two parts 14a, 14b of the side gear incorporate respectively sets of grooves 24 and teeth 25, preferably spaced regularly around the periphery of the sleeve 14b, which mark the boundaries of ramps 26, 27 which cooperate to produce an axial displacement of the sleeve 14b when a torque is in transit through the differential as shown in F1 of FIG. 2. The orientation and slope of these ramps are chosen in such a way that the sleeve 14b is displaced towards the left when facing the drawing when an engine torque is in transit through the differential. The first part 14a is not allowed to move axially due to the abutment with face 22 and the meshing of gear teeth 21 with the teeth of the side pinions 19.

Figure 2:
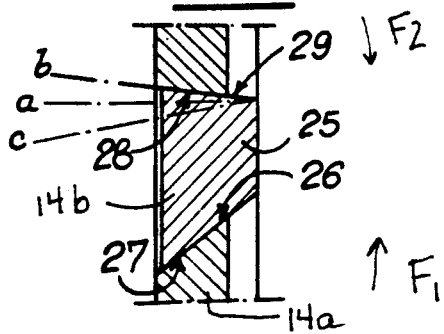
FIG. 2 is a cross-sectional view through the line 2—2 of FIG. 1.

When the torque which is in transit through the differential corresponds to engine braking as shown in F2 of FIG. 2, it is ramps or stops 28, 29 which are involved in transmitting this torque and, depending on the orientation of these ramps or stops, different operational characteristics can be obtained. Thus, three possible orientations denoted respectively by a, b and c have been represented in FIG. 2.

A spring constituted by a Belleville washer 30 is interposed between the differential housing and the mobile sleeve 14b, and returns this sleeve towards the right when looking at FIG. 1.

Packing rings 31, 32 are also provided between this sleeve on the one hand and the housing and the shaft 16 on the other hand.

A controlled-slip coupling device or viscocoupler 33 is embedded inside the housing 10 on the side of the side gear 14. This coupling device is of the type consisting of two alternating sets of discs, a first set 34 being made to rotate solidly by splines on the output shaft 16 associated with the side gear 14, while the other set of discs 35 is made to rotate solidly by means of splines of the differential housing. These discs are immersed in a viscous fluid operating in shear, which may for example be a silicone oil. The vessel containing this fluid is partly bounded by the end of the sleeve 14b.

Such a device operates as follows:

In the absence of engine torque, the coupling device 33 is only operated or controlled by the difference in the rotational speeds between the housing 10 and the output shaft 16 associated with the side gear 14. Since the characteristic $Cv=f(\Delta n)$ is chosen to be fairly low (where Cv is the opposing torque due to the viscocoupler and $\Delta n$ is the difference in the rotational speeds between the housing and the shaft 16), such a differential offers little resistance to manoeuvres at very low speeds.

As soon as an effective engine torque is transmitted to the wheels, forces are exerted at the level of the ramps 26 and 27, thus producing a displacement of the sleeve 14b towards the left. This displacement has the effect of reducing the volume offered to the viscous fluid in the vessel bounded by the housing 10, the shaft 16 and the end of the sleeve 14b. This reduction in the volume of the vessel results in an increase in the internal fluid pressure and hence in a modification to the characteristic law $Cv=f(\Delta n)$, which makes the viscocoupler more efficient in situations which are encountered when an engine torque is transmitted to the wheels.

When the torque is reversed and becomes a braking torque, it is the faces 28, 29 which come into contact. If these faces are parallel to the axis of rotation of the side gears (solution a in FIG. 2), the sleeve is not acted upon so as to be displaced axially, except of course by the spring 30. The two other profiles b and c represented in FIG. 2, on the contrary, produce a slight tendency for the sleeve to be displaced in one direction or the other, which may be desirable in certain cases.

Figure 3:
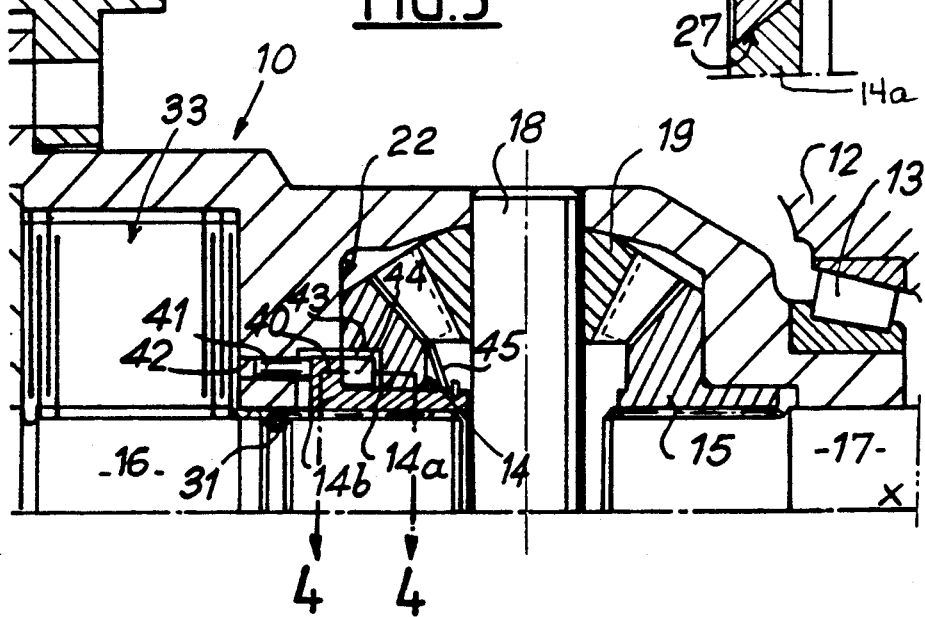
FIG. 3 is a partial longitudinal cross-sectional view of a variant of the embodiment.

In FIG. 3, there are several elements which are analogous to those in FIG. 1 and which are denoted by the same reference numbers. In this variant of the embodiment, the mobile part 14b of the side gear includes a radial flange 40 which bears on at least one shuttle 41 received in a boring 42 in the housing, which opens out into the viscocoupler vessel.

Figure 4A:
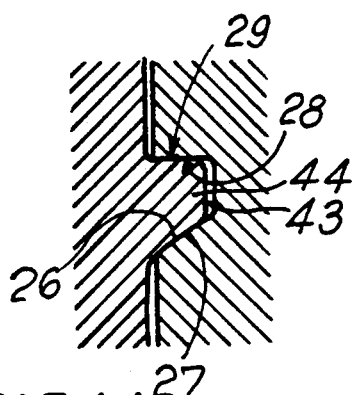
FIGS. 4A and 4B represent two cross-sectional views through the line 4—4 of FIG. 3 according to two variants of the embodiment.

In addition, the means of connection between the two parts of the side gear are here constituted by grooves 43 and lateral dog clutch teeth 44 marking the boundary, as in the previous example, of the ramps 26, 27 and 28, 29. These ramps are shown according to two variants in FIGS. 4A and 4B. An elastic restoring component consisting of a Belleville washer 45 is disposed in this case between the two components forming the side gear and no longer between the differential housing and the mobile part of this side gear.

The operation of this device is wholly comparable with that described previously, except for the difference that it is the displacement of the shuttle or of each shuttle which produces a variation in the volume and hence in the internal pressure of the viscocoupler.

Figure 5:
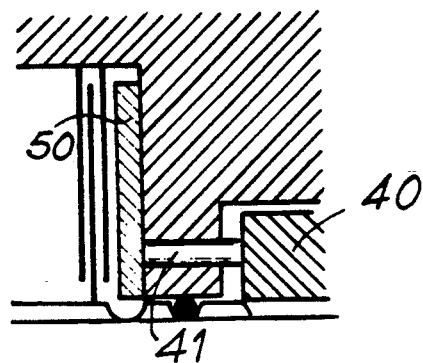
FIG. 5 is a partial cross-sectional view of another variant.

According to another detail variant (FIG. 5), the shuttles 41 can be brought to bear on a mobile plate 50 incorporated in the viscocoupler and capable of altering the separation between the discs of the said viscocoupler.

Figure 6:
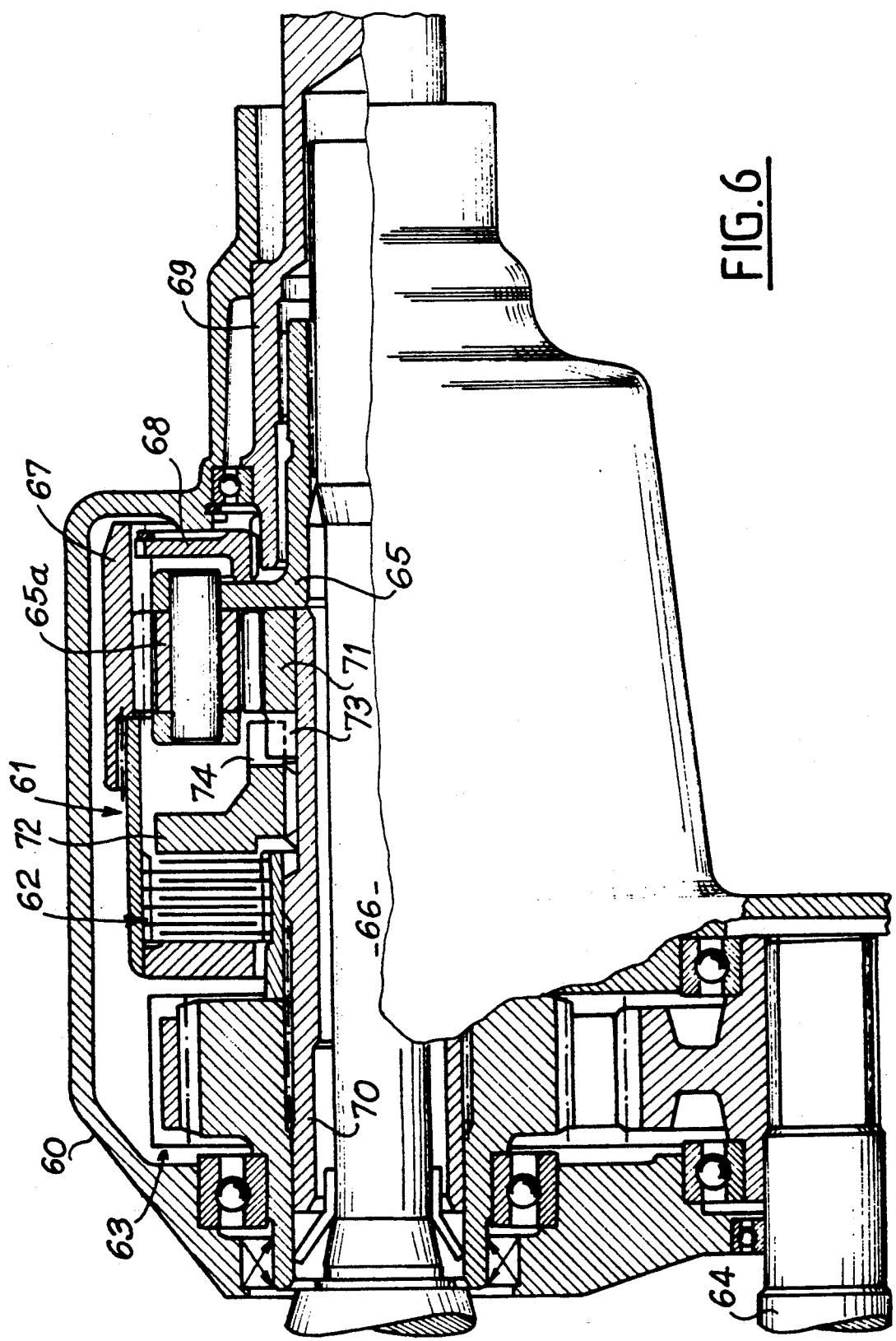
FIG. 6 is a longitudinal cross-sectional view of another mode of embodiment of the invention applied to a differential with an epicyclic gear train.

FIG. 6 represents a mode of embodiment in which the invention is applied to an inter-axle differential with an epicyclic gear train. The device comprises a housing 60 in which are disposed the differential 61, a disc clutch 62 and a transmission mechanism with a timing belt 63 ensuring the return towards a propeller shaft 64 connected to a front axle.

The differential includes a pinion-holder 65 which is connected to the input shaft 66, a crown wheel 67 rotating solidly with a wheel disc 68 and an output shaft 69 which forms a shaft for transmission to a rear axle, and a side gear connected to a second output shaft 70 coaxial with the input shaft and which is intended to drive the shaft 64 for transmission to the front axle.

According to the invention, the side gear is made in two parts, a first part 71 mounted so that it is free to rotate on the shaft 70 and which engages with the side pinions 65a, and a second part 72 which is rotating solidly because of splines on the output shaft 70 and which constitutes a thrust plate capable of acting on the clutch 62. Means for connection to ramps 73, 74 similar to those described in connection with FIG. 3 are provided between the two parts 71 and 72 of the side gear.

The operation of such a device is analogous to that described previously, except that the mobile part 72 of the side gear simply acts to control or operate a disc clutch and not to alter the operational characteristic of a viscous-fluid coupling.

However, in this embodiment as in the previous ones, it is found that it is the torque passing in transit through the differential which, in a simple and reliable way, produces an action on a coupling associated with the differential. The means used are in fact particularly compact and cheap since it is sufficient in all cases to make an output element of the differential in two parts and to provide between these two parts ramps which have the effect of displacing the mobile part of the said output element axially over a predetermined distance. Such a solution is particularly attractive in that it means that no changes are needed in the gearing conditions of the output element in question, since the part of this element which cooperates with the other components of the differential is fixed axially, so that the usual sets of teeth are preserved, thus guaranteeing reliable and silent operation.

Figure 7:
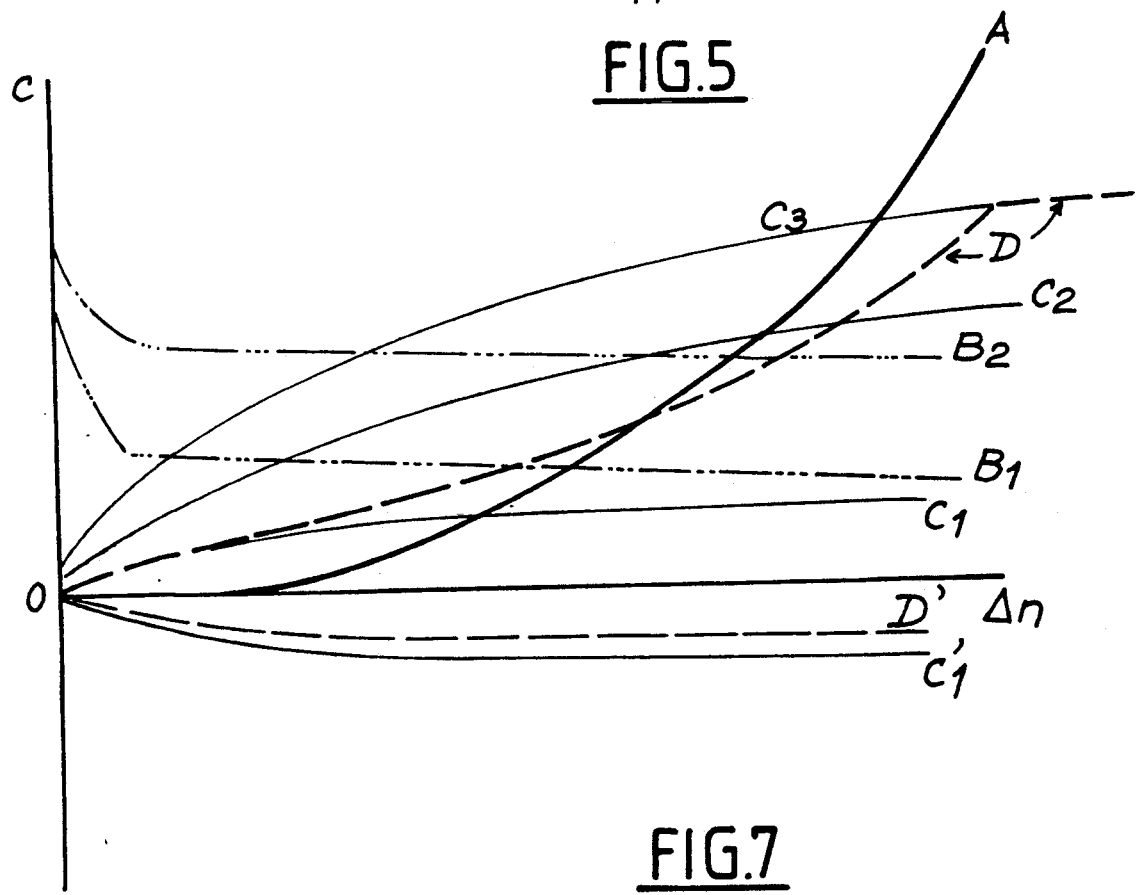
FIG. 7 is a diagram illustrating the operation of a device according to the invention.

The operation of a device according to the invention is illustrated in FIG. 7 where a C/Δn diagram shows the characteristics of known solutions, of the solution according to the invention and of an "ideal" solution denoted by the reference letter A. The curves B1 and B2 correspond to solutions of the friction clutch type for two different ratings. The curves C1, C2, C3 illustrate three characteristics of known viscocoupler devices. The curve D corresponds to the use of the invention applied to the control of a viscocoupler, and it can be seen that it passes progressively, under an engine torque, from the basic characteristic C1 to the extreme characteristic C3, the end part of the curve D corresponding to the coming into play of stops, which limit the axial displacement of the mobile sleeve.

Figure 4B:
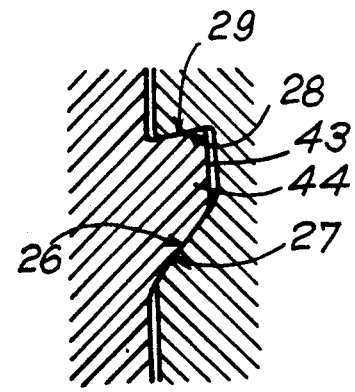

The lower part of the diagram illustrates what happens during operation with engine braking. If the ramps which are involved in this operational situation are parallel to the X—X axis, a characteristic C'1 symmetrical to the characteristic C1 is obtained. It is even possible to obtain a characteristic D' weaker than C'1 if the ramps have an undercut profile as shown in FIGS. 2 and 4B.

It should also be noted that, in the application to a device incorporating a viscocoupler, the invention allows the phenomenon of viscocoupler locking to occur under the effect of an increase in pressure, itself resulting from an increase in temperature, this phenomenon being very frequently sought in order to be able to start under extreme limiting conditions of poor road-holding.

I claim:

1. A transmission device comprising:
 a differential having a housing (10;60), an input element and a first and second output element, said first output element of the differential being made in two parts;
 a first part (14a;71) of said two parts of said first output element having teeth in meshing engagement with at least one other component of the differential, said first part further defining a radial surface in axial abutment against an adjacent radial surface which is fixed with respect to said input element;
 a second part (14b; 72) of said two parts of said first output element being axially movable over a limited distance; said second part being connected to rotate with an output shaft;
 a coupling device (33; 62) being disposed between said output shaft and one of said housing, said input element or said second output element; and
 means (24,25; 43,44; 73,74) provided between said first part and said second part of said first output element for allowing a limited angular movement between them such that a relative angular displacement between said first and second part in at least one direction under the effect of a torque provides for an axial displacement of the second part, said axial displacement modifying an operating condition of the coupling device.

2. Device according to claim 1 wherein said first part (14a) abuts one face (22) of the differential housing.

3. Device according to claim 1 wherein said first part (71) bears against one face (22) of a pinion-holder (65) forming part of the differential.

4. Device according to claim 1 wherein said means comprise a first set of ramps (26, 27) inclined with respect to the direction of the (X—X) axis of the first output element, said first set of ramps engaging each other when a driving torque is transmitted by the differential.

5. Device according to claim 4 wherein said means comprise a second set of ramps (28, 29) which engage each other when a braking torque is transmitted by the differential.

6. Device according to claim 5 wherein said second set of ramps (28, 29) are oriented parallel to the (X—X) axis of said first output element.

7. Device according to claim 5 wherein said second set of ramps (28, 29) are inclined with respect to the direction of the (X—X) axis of said first output element.

8. Device according to claim 1 wherein said first output element is a side gear.

9. Device according to claim 8 wherein said second part of the side gear incorporates a sleeve (14b) connected by splines to the output shaft (16; 70).

10. Device according to claim 9 wherein said sleeve (14b) extends concentrically inside the first part (14a) of the side gear.

11. Device according to claim 9 wherein the sleeve (14b) includes a radial flange (40) which bears against at least one shuttle (41) sliding axially in a bore (42) in the housing.

12. Device according to claim 9 wherein the sleeve incorporates a pressure plate (72) cooperating with the coupling device (62).

13. Device according to claim 1 wherein a return spring (30) in interposed between the housing (10) and the second part (14b) of the first output element.

14. Device according to claim 1 wherein a return spring (45) is interposed between the first and second parts (14a, 14b) of the first output element.